United States Patent [19]

De Palacio

[11] 4,059,995
[45] Nov. 29, 1977

[54] LEVEL INDICATORS FOR LIQUIDS

[76] Inventor: Raul Calderon De Palacio, Pensylvania 171, Mexico City, Mexico, 18

[21] Appl. No.: 709,330

[22] Filed: July 28, 1976

[30] Foreign Application Priority Data

Dec. 12, 1975 Mexico ................................ 162559

[51] Int. Cl.² ........................................... G01F 23/16
[52] U.S. Cl. ................................................... 73/301
[58] Field of Search .......................... 73/299, 301, 438

[56] References Cited

U.S. PATENT DOCUMENTS

| | | | |
|---|---|---|---|
| 1,029,598 | 6/1912 | Davis | 73/301 |
| 1,667,769 | 5/1928 | Callan | 73/299 |
| 2,797,702 | 7/1957 | Martin | 73/301 X |
| 2,870,635 | 1/1959 | Vollbrecht et al. | 73/299 |

FOREIGN PATENT DOCUMENTS

| | | | |
|---|---|---|---|
| 342,692 | 8/1936 | Italy | 73/299 |
| 596,917 | 1/1948 | United Kingdom | 73/299 |
| 159,674 | 3/1921 | United Kingdom | 73/299 |

Primary Examiner—Daniel M. Yasich
Attorney, Agent, or Firm—Jacobs & Jacobs

[57] ABSTRACT

A liquid level indicator comprises a mercury-filled U-tube having a plurality of branches and calibrating rods for insertion into the branches. One arm of the U-tube is subject to the hydrostatic pressure in the receptacle holding the liquid whose level is to be indicated, and the level of mercury in the other arm indicates the liquid level via a colored liquid.

5 Claims, 1 Drawing Figure

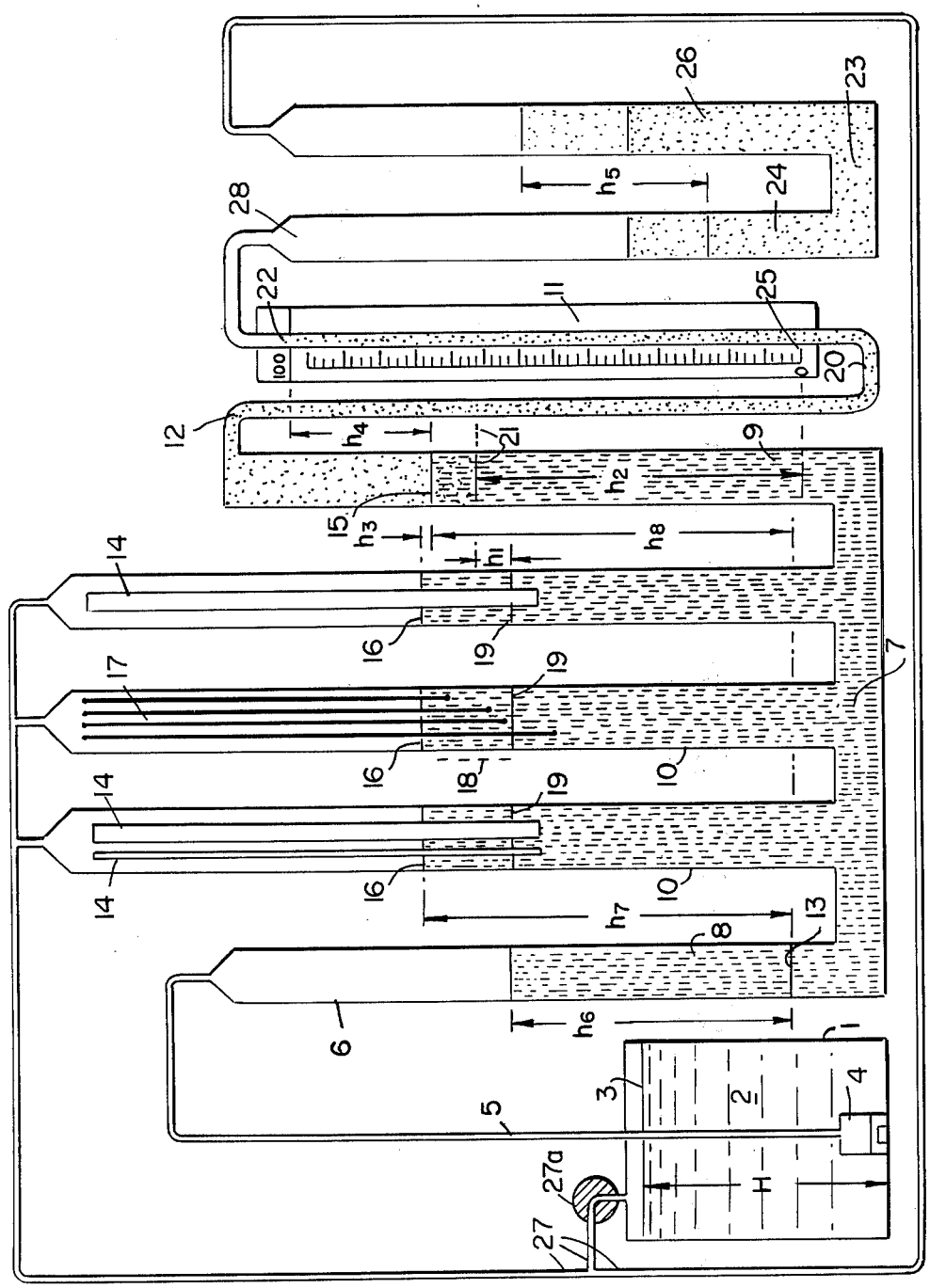

LEVEL INDICATORS FOR LIQUIDS

The present invention relates to a liquid level indicator, comprising a mercury-filled U-tube to measure the hydrostatic pressure of liquid stored in a receptacle in accordance with the height reached by the level of the liquid within the receptacle, and one or more mercury-filled branches. The mercury-filled U-tube communicates with a U-tube of smaller diameter which contains a colored liquid and which indicates on a scale the volume, weight, height, or density of the liquid in the tank, depending on the units in which the scale is calibrated, since the height to which the colored liquid rises within the U-tube of smaller diameter is directly proportional to the height to which the liquid contained in the receptacle rises.

The hydrostatic pressure exerted by the liquid in the tank is transmitted from the bottom of the tank or receptacle to the indicator by a tubing of small diameter having at one end a bell-shaped widening which generally rests on the bottom of the receptacle so as to form an air chamber and being connected to an arm of the mercury U-tube. The liquid contained in the tank strives to enter the mouth of the bell which faces downward and subjects the air contained therein to the pressure of the liquid; this pressure is transmitted through the air contained in the tubing to the mercury U-tube, forcing the mercury contained in the arm of the "U" to descend and, as a result, the level of the mercury will rise both in the other arm of the "U" and in the branches thereof. This, in turn, will cause the level of the colored liquid to rise in the downstream arm of the small diameter "U", which will provide, on a scale, an indication of the liquid level in the tank. If the level of the liquid contained in the tank drops, the levels of the mercury and color liquid will also drop.

In the branches which have been made on the mercury-filled "U", there may be introduced one or more calibrator rods of different diameters in order to adjust the height to which the colored liquid is to rise under the action of the mercury.

A third "U" is provided as a means to compensate for temperature variations.

The present invention is illustrated in terms of a preferred embodiment in the accompanying drawing, with like reference numbers being used to indicate the like parts. The drawing schematically illustrates a level indicator in accordance with the present invention.

As shown in the drawing, tank 1 contains a liquid 2 which is capable of reaching a given or arbitrary level 3 which is to be measured. The level indicator includes an air chamber or bulb 4 at the bottom of tank 1, which is connected to a duct 5, preferably a capillary duct, which continues to the top of the first arm 6 of the "U" 7 which contains mercury 8. The level of the mercury in arm 6 will fall due to the pressure conducted through the duct 5, whereby a given volume of mercury is displaced and will be distributed between the last arm 9 and the branches 10 of the "U" 7 so that the sum of these distributed volumes will be equal to the volume of mercury displaced in the arm 6.

The volume of mercury in arm 9 must be precisely determined in order to obtain a reading on the scale 11, given by the colored liquid 12, which accurately corresponds to the level of the liquid 2 stored in the tank 1. This is obtained by controlling the amount of mercury which is to enter each one of the branches 10 by decreasing the cross-section of said branches 10 so that the sum of the volumes of mercury that enter the branches 10 plus the volume of mercury that enters the arm 9 is equal to the volume of mercury displaced to the level 13 of the first arm 6 by the hydrostatic pressure of the liquid stored in the tank.

The decrease in the cross-section of the branches 10 is obtained by introducing the calibrating rods 14 into them. This is supplemented by the condition which automatically arises that the hydrostatic pressure of the liquid in the tank 1 must be balanced by a counter-pressure exercised by the difference in level $h7$ which automatically is produced between the level 13 to which the mercury 8 falls in the first arm 6 of the "U" 7 and the level 15 to which it must rise in the second arm 9 as well as the level 16 in the branches 10, which explains how the volume of mercury can adjust itself in the manner already indicated when the cross-section of the branches is reduced.

The drawing shows the positions of the different levels of mercury in the arms 6 and 9 and the branches 10, which contain mercury, and in U-tube 20 of smaller diameter which contains a colored liquid, as well as in the temperature compensation "U" 23.

Furthermore, the drawing shows a signal system which consists in the provision of one or more electrodes 17 in one or more of the branches 10 which contain mercury, which electrodes successively contact the mercury as the mercury rises because of the rising of the liquid 2 to the level 3 in the tank 1, and generate successive signals which indicate the different levels 3 which the liquid stored in the tank 1 reaches. Contacts 18 may also be arranged in the wall of one of the branches 10 (in this case that which bears the electrodes 17) and which serve the same purpose as the electrodes 17.

The different levels, both of the mercury and of the colored liquid, represent the "empty" and "full" positions of the tank. The levels 19 and 21 correspond to the empty tank 1. The head, $h1$, is produced and balanced by the difference between colored liquid levels 21 (i.e. $h_2$) and 25 in the first arm of the U tube 20. When the tank is full, it exerts a hydrostatic pressure or head "H" on the chamber of the air contained in the bulb 4, which head is transmitted by the air contained in the tubing 5 which extends from the bulb 4 to the upper part of the arm 6 and causes the mercury to fall a given height $h6$, displacing a corresponding volume of mercury which will be distributed between arm 9 and branches 10.

When the mercury rises in arm 9, it displaces a volume of colored liquid between the levels 21 and 15 into the narrow diameter U-tube 20, between the "zero" mark 25 and the "one hundred" mark 22. The scale is calibrated or otherwise adjusted by introducing into the branches 10 the "calibrating rods" 14 which reduce the cross-section of the branches 10 and cause smaller volumes of mercury to cause a larger increase in height in arm 9. The equilibrium of the pressure will always be automatically obtained, since the mercury will rise in the branches 10 up to a height such as 16 which produces a pressure $h7$ which counteracts the transmitted pressure H from the tank 1, and in the second arm 9 of the "U" 7, this pressure which comes from the tank will be counteracted by the column of mercury $h8$ and the sum of the pressures produced by the columns of colored liquid $h5$ in U-tube 23 and $h4$ in U-tube 20 which produce the difference in level of the mercury column $h3$.

Variations in temperature produce expansions in the columns of mercury which increase their level in the arms of the "U" and in the branches thereof. The only column of mercury which would cause errors in the readings on the scale is the one contained in the second arm 9 of the "U" 7, since this arm is directly in contact with the colored liquid 12. Increased movements of mercury in arm 9 due to expansion or contraction would be reflected by the level of liquid 12, and the problem is to make this column of mercury in arm 9 free from the effects of changes in temperature. This is obtained by connecting the U-tube 20 to arm 24 of the temperature compensation U-tube 23, while the arm 26 of U-tube 23 is connected to tank 1 by tubing 27 through valve 27a. Tubing 27 also connects the sealed branches 10 to the tank 1 through valve 27a. Tubing 27 enters tank 1 at its top if the tank is subject to a pressure other than atmospheric pressure. If the tank 1 is open directly to the atmosphere, then tube 27 can also be open to the atmosphere by rotating valve 27a 90° clockwise. This third "U" 23 will contain a liquid identical or similar to the colored liquid 12. Diethylene glycol or triethylene glycol are best suited because they have a very high boiling point and there is practically no evaporation at ambient temperature. An air chamber 28 is provided in arm 24 above the liquid in arm 24 back to the point 25 in the U-tube 20. The volume of air chamber 28 is determined by placing a greater or smaller amount of liquid in the "U" 23 itself in order to obtain the result that when the temperature increases and the column of mercury tends to expand, the air chamber 28 will also expand in proportion of their respective coefficients of expansion, producing a drop in the level of the liquid in arm 24 and a rise in arm 26, whereby there is obtained an opposing head $h5$ that will act on the colored liquid contained in the U-tube 20 and will be exerted on the surface 15 of contact between the liquid in tube 20 and the column of mercury in the arm 9 of the "U" 7 and will cancel out the tendency of the column of mercury to increase its level. Therefore the reading of the colored liquid on the scale will not fluctuate due to temperature.

This arrangement in no way reduces the sensitivity of the indicator, since the opposing head which it adds is counterbalanced, as already explained, by the difference in level $h3$ which is produced in the column of mercury in arm 9 and those of the branches 10, namely the difference in level $h3$ which in no way opposes the recording of the upward or downward movements of the liquid 2, contained in the tank 1.

The purpose of making the communication of the branches 10 with the "U" 7 independent, in whole or in part, is in order to increase the range of the indicator.

I claim:

1. Apparatus for indicating the level of liquid in a receptacle, which comprises:
   a. a first U-tube having a horizontal base, a pair of vertical arms at opposite ends of the base and a plurality of vertical branches rising from said base, the base, arms and branches being in fluid communication and containing a dense indicating liquid, and means for adjusting the liquid level in said branches;
   b. means for transmitting hydrostatic pressure from the receptable to the surface of said dense liquid in one of said arms of said first U-tube;
   c. a second U-tube, conduit means for providing fluid communication between said other arm of said first U-tube and an arm of said second U-tube, the second U-tube being of smaller diameter than said first U-tube, and a less dense liquid extending from the surface of the dense indicating liquid in said other arm of said first U-tube through said conduit means and into said second U-tube, the height of the less dense liquid in the other arm of the second U-tube being an indication of the liquid level in said receptacle;
   d. a third U-tube of larger diameter than said second U-tube and containing a less dense liquid, second conduit means for providing fluid communication between the other arm of said second U-tube and an arm of the third U-tube, there being a volume of air between the liquids in said second and third U-tubes such that any expansion or contraction in the indicating liquid contained in said other arm of the first U-tube as a result of a change in ambient temperature will produce a proportionate change in volume of the air to cause porportionally an opposing head of liquid in the other arm of the third U-tube in compensation therefor; and
   e. conduit means for connecting the free arm of the third U-tube and the branches to the atmosphere when the receptacle is selected to be open to the atmosphere or to the top of the receptacle when the receptacle is subject to a pressure different from atmospheric.

2. Apparatus according to claim 1, wherein said adjusting means comprises rod means in at least one of said branches.

3. Apparatus according to claim 1, wherein electrode means are operatively associated with at least one of said branches, said electrode means producing a signal when contacted by the liquid in the branch.

4. Apparatus according to claim 1, wherein said dense liquid is mercury.

5. Apparatus according to claim 1, wherein the branches are at least in part independent of the primary U-tube or of each other.

* * * * *